United States Patent
Saxena et al.

(10) Patent No.: US 8,504,532 B2
(45) Date of Patent: Aug. 6, 2013

(54) SYSTEM AND METHOD FOR DELETION OF DATA IN A REMOTE COMPUTING PLATFORM

(75) Inventors: Ashutosh Saxena, Hyderabad (IN); Mithun Paul, Kottayam District (IN)

(73) Assignee: Infosys Limited (IN)

( * ) Notice: Subject to any disclaimer, the term of this patent is extended or adjusted under 35 U.S.C. 154(b) by 0 days.

(21) Appl. No.: 13/241,946

(22) Filed: Sep. 23, 2011

(65) Prior Publication Data

US 2012/0317083 A1 Dec. 13, 2012

(30) Foreign Application Priority Data

Jun. 10, 2011 (IN) .......................... 1968/CHE/2011

(51) Int. Cl.
*G06F 17/00* (2006.01)
(52) U.S. Cl.
USPC ................................ 707/692; 706/12; 706/14
(58) Field of Classification Search
None
See application file for complete search history.

(56) References Cited

U.S. PATENT DOCUMENTS

| 2011/0055588 | A1* | 3/2011 | DeHaan ......................... 713/189 |
| 2011/0276490 | A1* | 11/2011 | Wang et al. ...................... 705/50 |
| 2011/0321120 | A1* | 12/2011 | Saxena et al. ...................... 726/1 |

OTHER PUBLICATIONS

Paul et al, "Proof of Erasability for Ensuring Comprehensive Data Deletion in Cloud Computing", May 2010.*
Paul et al, "Zero Data Remnance Proof in Cloud Storage", Oct. 2010.*

* cited by examiner

*Primary Examiner* — Hung Le
(74) *Attorney, Agent, or Firm* — Lerner, David, Littenberg, Krumholz & Mentlik, LLP

(57) ABSTRACT

Embodiments of a system and method to perform a secure deletion of a set of data from a remote cloud computing system are described. As described, in some embodiments, a user of a cloud computing service that provides data storage may securely delete his stored set of data by acquiring elevated access privileges to the stored set of data, designating at least one most significant bit in at least one data block therein as a sentinel and recording its value and position, updating the value of the sentinels and thereby rendering the data unusable, and verifying the success of the operation by checking the new value of the sentinels against the original value. In some embodiments, the verification process may be repeated in order to ensure that the data has been rendered useless across all nodes of the remote cloud platform.

17 Claims, 4 Drawing Sheets

SYSTEM AND METHOD FOR DELETION OF DATA IN A REMOTE COMPUTING PLATFORM

FIELD OF THE INVENTION

The field of the invention relates generally to the preservation of data privacy in a cloud computing platform that provides data storage as a service. In particular, the invention relates to a method of secure, user verifiable, deletion of data from a remote cloud computing platform.

BACKGROUND OF THE INVENTION

Cloud computing services, that is, the provision of computing resources on demand via a computer network, have acquired increasing prominence in recent years. Services provided to a client by a contemporary 'cloud' service provider may encompass a wide variety of discrete business models. These range from such models as Software-as-a-Service which may include application delivery across a browser, for example, to, notably, utility computing models that include Storage-as-a-Service—a service that provides data storage capability to a client or user.

Storage based service models in remote, cloud-based, computing platforms are predicated on the availability to the provider of a large pool of easily usable and accessible virtualized resources that can be dynamically re-configured to adjust to variable loads, i.e. scale as necessary. Access to these services is generally controlled by an SLA, which may specify a variety of differentiated service levels in exchange for tiered compensation. The core idea, then, is that a user of the service may store a limited number of files, dependent on his agreed upon service level, in the remote cloud platform, and is then able to retrieve those files, on demand, at any time or place, unaffected by such factors as aggregate traffic or local disasters.

This model is open to a number of privacy concerns, however. One such prominent concern involves potential access to a client's data by the cloud provider. While any such access is usually proscribed by the relevant SLA during the term of the client's contract with the cloud provider, these terms may expire on withdrawal from the service. A client may choose to delete his data prior to withdrawal, but there is no verifiable guarantee that the provider's standard deletion mechanisms are sufficient to render the data unusable and inaccessible to the provider. One mechanism available to the client that may address this concern is data encryption—that is, to encrypt all data prior to storage in the cloud. This is a wide-ranging, catch-all solution in which any effective implementation would impose a large cost, however, by requiring, among other things, significant computational time and resources. Such constraints are particularly marked when the client is a small to medium enterprise for whom data security is vital, but is, nonetheless, unable to afford its own storage architecture.

A further concern is that any large-scale removal of data, even encrypted data, by a client may alert the service provider of an intention to withdraw from the cloud service, which may, sometimes, encourage the service provider to extract or otherwise tamper with any data that remains on the cloud platform. It is important, therefore, that any move to destroy the data by the client, prior to withdrawal, is as discreet as possible to avoid alerting the service provider of his intentions.

What is needed, then, is a method for secure, client-verifiable, deletion of data from a remote cloud computing platform that is, at the same time, invisible to the service provider. Given the ability to self-verify, the client may be satisfied that his data has been rendered unusable going forward, giving him the flexibility to transition to a different service provider without any reservations about the state of data left behind.

SUMMARY OF THE INVENTION

The present invention relates to a computer implemented method for deletion of data in a remote cloud computing platform. A method described may comprise designating at least one most significant bit of at least one data block in a set of data stored in the remote cloud computing platform as a sentinel, wherein the at least one most significant bit is randomly selected, and the remote cloud computing platform is accessible by means of a communication network and possesses one or more computational resource nodes in operable communication with each other. The method may further include recording a first value of the at least one sentinel, shredding the set of data, wherein the set of data is shredded by means of an update operation capable of executing one or more operations selected from a group consisting of read, write and execute operations on the set of data, and verifying success of the shredding of the set of data, wherein a second value of the at least one sentinel is recorded and compared with the first value of the at least one sentinel.

In an additional aspect of the invention, an embodiment of a system for shredding data stored by a user in a remote cloud computing platform is described. The system may comprise a set of data stored by the user in the remote cloud computing platform, wherein the remote cloud computing platform is accessible by means of a communication network and possesses one or more computational resource nodes in operable communication with each other. It may additionally include a processor in operable communication with a processor readable storage medium, the processor readable storage medium containing one or more programming instructions whereby the processor is configured to implement a destruction module, wherein the set of data is destroyed by the destruction module by means of an update operation, the update operation capable of executing one or more operations from a group selected from read, write and execute operations on the set of data, and a verification module, wherein the verification module is configured to verify success in the destruction of the set of data, by specifying an address of at least one most significant bit in the set of data, recording a first value and a second value of the at least one most significant bit that is accessed thereby, and comparing the first value of the at least one most significant bit with the second value so recorded.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Many modifications and adaptations will be apparent to those skilled in the relevant art in view of the following description and the accompanying drawings and the appended claims. While the system and method described herein are provided with a certain degree of specificity, the present technique may be implemented with either greater or lesser specificity, depending on the needs of the user. The present description should be considered as merely illustrative of the principles of the present technique and not in limitation thereof, since the present technique is defined solely by the claims.

An initial step that occurs when a client, such as an individual user or an enterprise, approaches a cloud service provider in order to procure data storage involves the signing of an SLA (Service Level Agreement) between the two. The SLA specifies a range of services, which may include guarantees with respect to data preservation and security that are offered by the provider in exchange for an agreed-upon storage rental rate etc. At this point in the client-provider relationship, there may be mutual trust within the bounds of the SLA, and the client may upload his set of data to the provider's cloud platform.

Figure 1:
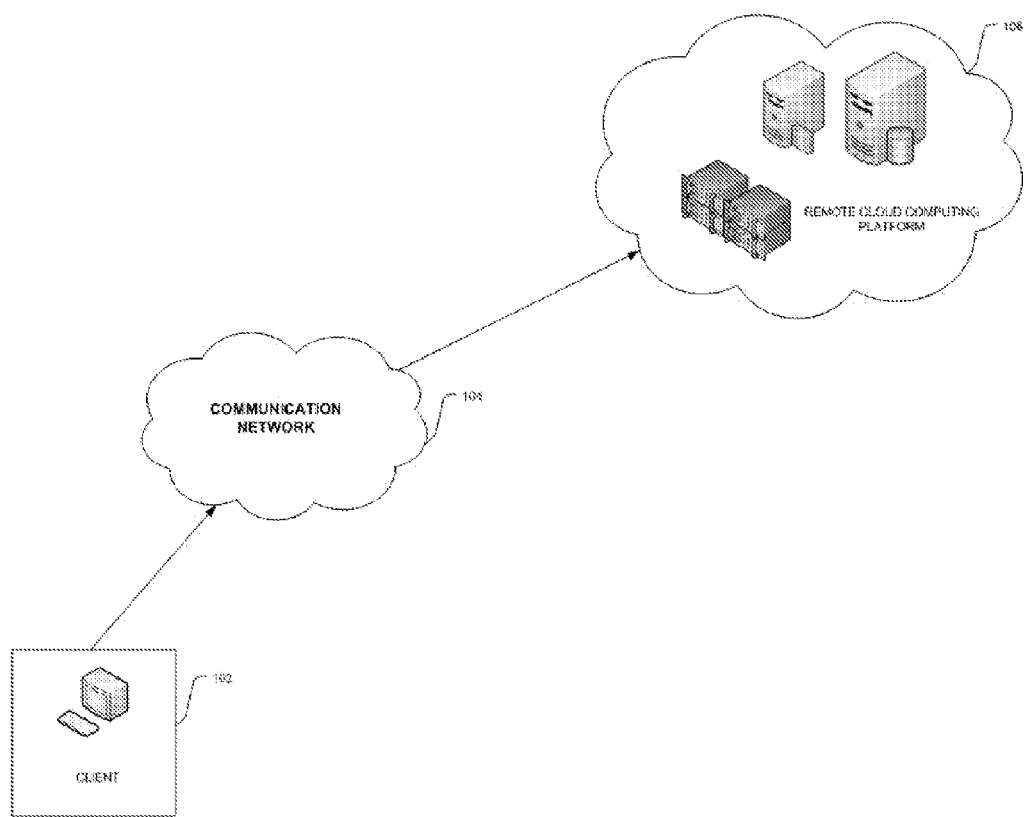
FIG. 1 is an illustrative flow diagram depicting a process of secure deletion of data from a remote computing platform.

To that end, referring now to FIG. 1, the client 102 accesses the remote cloud computing platform 106 by means of a communications network 104. The client 102 is able to upload or modify data by means of an application running on the client's system, such as a general purpose web browser or a specialized application, wherein the application interfaces with the remote computing platform 106 by means of a communication network 104 wherein the communication network may be the Internet, or a restricted network. Additionally, the remote cloud computing platform 106 may consist of a cluster of one or more computational nodes, including a central node, or name node, wherein a directory tree of files that are stored in the file system is kept. If the cloud platform comprises one or more resource nodes in addition to a central node, the central node may track or synchronize data across the one or more remote nodes. Multiple copies of the same set of data may be stored across the one or more remote nodes in order to provide redundancy in the event of unexpected data loss in any node.

Some SaaS (Storage-as-a-Service) providers may, by default, restrict some permissions, such as read/write/execute access at the bit-level, to a client's set of data that has been uploaded to their remote cloud computing platform. In such an instance, the client/user may call an elevation module provided, which elevates authorization privileges to a point whereby the client has similar rights to that possessed by the provider, i.e. bit level read/write/execute access with respect to the client's own stored set of data. Some SaaS, providers automatically provide such an elevated set of privileges to the client however, rendering the use of an elevation module superfluous.

If the client then wishes to change providers, it is in his interest to protect the stored set of data from any possibility of reuse, prior to withdrawal from the SLA. An embodiment of the invention whereby the stored set may be securely deleted without alerting the service provider is described with reference to FIG. 2. As previously disclosed, the user may acquire elevated access privileges to his stored set of data by means of the provided elevation module 204 in communication with the remote computing platform 210.

Figure 2:
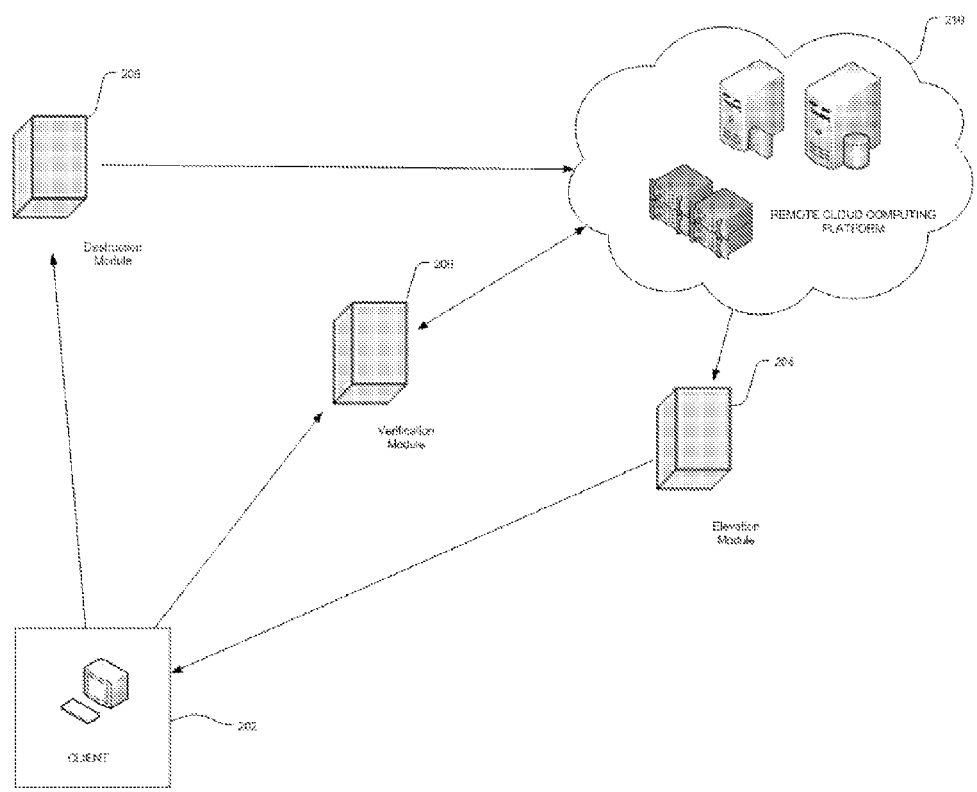
FIG. 2 is an illustrative architecture diagram depicting an interaction between a client system and a remote computing platform.
Figure 3:
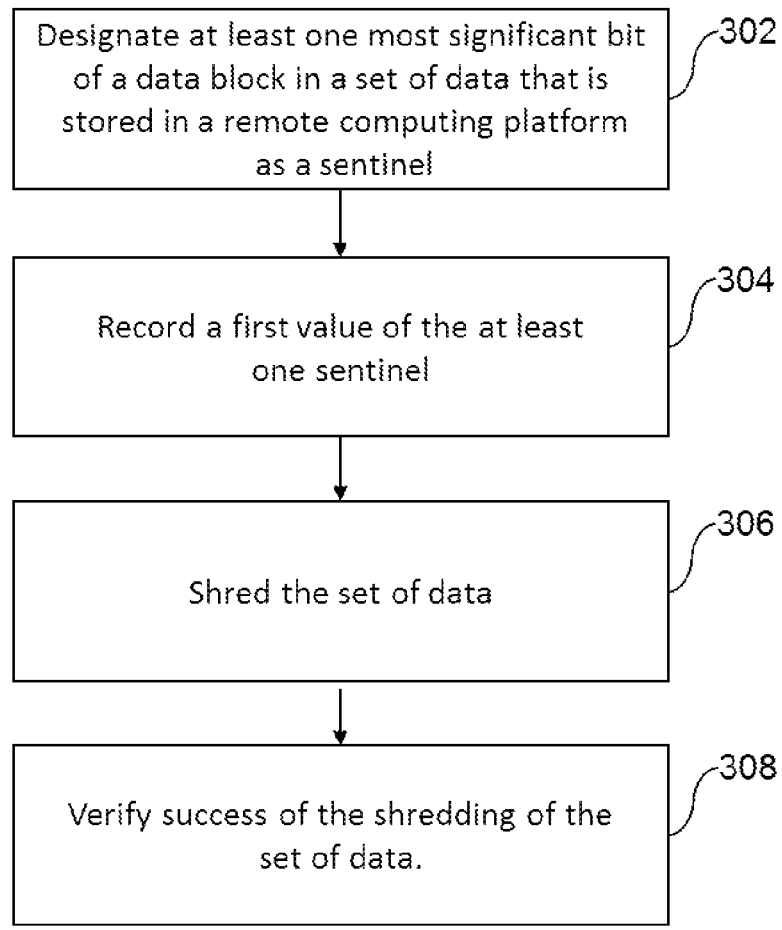
FIG. 3 is an illustrative embodiment of a method of secure deletion of data from a remote cloud computing platform, wherein one or more data flows between a client system and the remote computing platform are depicted.

The embodiment of the invention is further explained in conjunction with FIG. 3. Referring now to FIG. 3, as in a block 302, at least one most significant bit of a data block belonging to the stored set of data is designated as a sentinel. The most significant bit is randomly selected in order to ensure that the at least one designated sentinels are representative of the state of the stored set of data. Then, as in a block 304, the value and position of the at least one sentinel is recorded. The stored set of the data is then shredded, as in a block 306, by means of the destruction module. Referring now to FIG. 2, in order to shred the stored set of data, the destruction module 208 is called, as indicated, by the client 202. Given the extant elevated access privileges to the stored set of data, the destruction module 208 then performs a data update operation on the client's stored set of data wherein the value of the most significant bit of every data block of the client's set of data is flipped, rendering the data unusable. In this way, the stored set of data that is present on the central name node may be shredded.

The data synchronization function of the central node, whereby the central node synchronizes data across all remote nodes in order to ensure that all copies stored in the cloud are up to date, may then be exploited. Given that, in effect, a mere update operation of the stored set of data has been performed, albeit one that has effectively rendered the client's data stored therein useless, the synchronization performed by the central node may in itself serve to ensure that all copies of the stored set of data in the cloud are similarly rendered useless. By relying on this inbuilt sync operation, the data destruction operation is both effective, and has low actual overhead as it merely exploits functionality that is inherent to the cloud platform.

Referring now to FIG. 3, following the shredding of the set of data, the success of the shredding operation is then verified, as in a block 308. In an embodiment of the invention, the verification is performed by means of a verification module. Referring again to FIG. 2, the verification module 206 in communication with the remote computing platform 210, is called by the client 202. To ensure that the entire set of data has been rendered unusable, the values of the one or more previously designated sentinels are checked. If the value of these sentinels differs from the original value recorded, a positive indicative response may be sent to the client. If not, a negative indicative response may be sent. In a preferred embodiment, the entire set of sentinels is not checked in this manner. Instead, only a percentage of the entire set of sentinels that are statistically representative of the entire set are checked in order to ensure that the data has been rendered useless.

Figure 4:
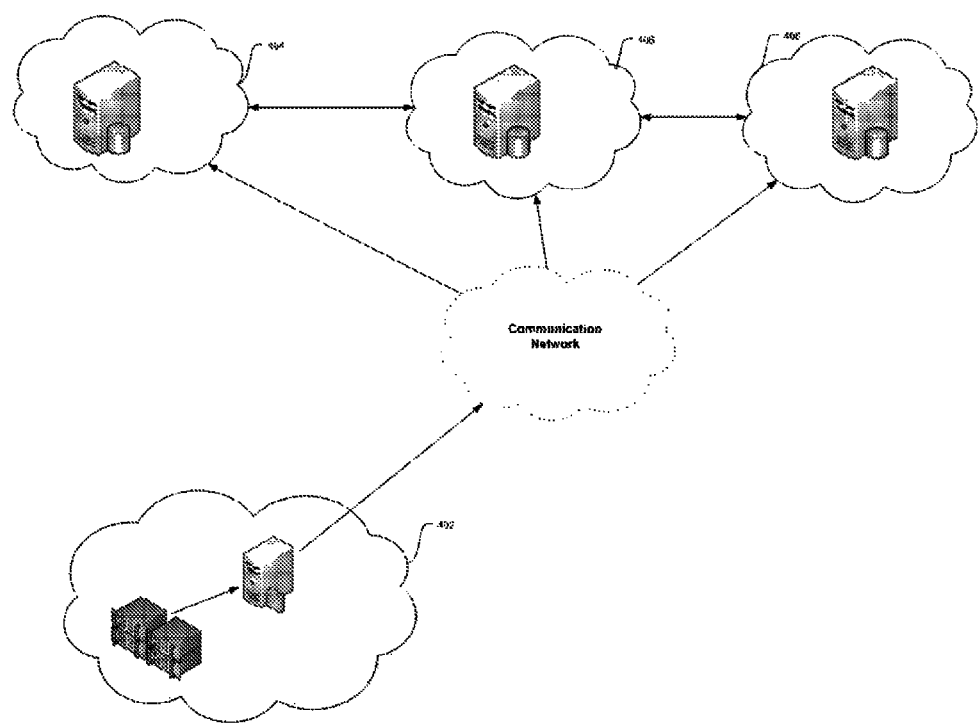
FIG. 4 is an illustrative diagram of an aspect of an embodiment wherein data is synchronized across one or more data nodes belonging to the remote computing platform.

Referring now to FIG. 4, a remote cloud computing platform may comprise a distributed architecture that consists of a central node and associated data storage racks 402, and, further, a set of one or more remote computational resources nodes as indicated by 404, 406 and 408. These remote nodes may be in operational communication with each other, and with the central node 402, by means of a communication network such as the internet, or an intranet. The remote nodes may store copies of the stored set of data in order to provide a level of data redundancy promised by the SLA. The data in these nodes, however, are synchronized with the central node. That is, following a certain latency period T, some data in the central node are synchronized with their copies in remote nodes. The latency time T is, again, contingent upon the SLA between the client and the provider.

In order to verify that all stored data, including copies, have been rendered useless, therefore, the client may request verification, by means of, for instance, the verification module. To do this, the verification procedure is repeated after a period of time T from the data shredding operation, wherein T is the aforementioned latency period for data synchronization between the central and remote nodes. If, as before, the verification module reports a positive outcome, the client may be satisfied that his set of data has been successfully shredded across all nodes in the remote cloud computing platform.

Finally, the elevation, destruction and verification modules may be implemented on the client system and interface with the remote cloud platform thereby. Alternatively, they may be implemented by a remote service provider as part of a private, public or hybrid cloud computing platform. Alternatively, they may be implemented and hosted by a third party remote service provider, wherein the third party remote service provider is not the owner of the remote cloud platform on which the client's set of data is stored.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The present description is the best presently-contemplated method for carrying out the present invention. Various modifications will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

The invention claimed is:

1. A computer implemented method for deletion of data in a remote cloud computing platform, the method comprising:
designating at least one most significant bit of at least one data block in a set of data stored in the remote cloud computing platform as a sentinel, wherein:
the set of data is stored by the user in the remote cloud computing platform;
the at least one most significant bit is randomly selected; and
the remote cloud computing platform is accessible by means of a communication network and possesses one or more computational resource nodes, the computational resource nodes in operable communication with each other;
recording a first value of the at least one sentinel;
shredding the set of data, wherein the set of data is shredded by means of an update operation, the update operation capable of executing one or more operations selected from a group consisting of read, write and execute operations on the set of data; and
verifying success of the shredding of the set of data, wherein a second value of the at least one sentinel is recorded and compared with the first value of the at least one sentinel.

2. The method as claimed in claim 1, wherein bit level access to the stored set of data is acquired by a means for access elevation.

3. The method as claimed in claim 1, further comprising signaling a positive response when the second value of the sentinel associated with a data block in the stored set of data differs in comparison with the first value recorded, and a negative response when they do not so differ.

4. The method as claimed in claim 3, further comprising verifying the success of the shredding of a subset of the entire stored set of data, wherein the total bit size of the subset is smaller than the total bit size of the entire stored set of data.

5. The method as claimed in claim 1, further comprising ascertaining a latency time from a service level agreement between a provider of the remote computing platform and the user whose data is stored in the remote computing platform, wherein the latency time is a time period following which one or more copies of the set of data across the one or more computational resource nodes are synchronized.

6. The method as claimed in claim 5, further comprising verifying the success of the shredding of the set of data following completion of the latency time associated with the remote computing platform.

7. The method as claimed in claim 6, further comprising shredding the stored set of data across each of the computational resource nodes in the remote computing platform.

8. A system for shredding data stored by a user in a remote cloud computing platform, the system comprising:
a set of data stored by the user in the remote cloud computing platform, wherein the remote cloud computing platform is accessible by means of a communication network and possesses one or more computational resource nodes, the computational resource nodes in operable communication with each other;
a processor in operable communication with a processor readable storage medium, the processor readable storage medium containing one or more programming instructions whereby the processor is configured to implement:
a destruction module, wherein the set of data is destroyed by the destruction module by means of an update operation, the update operation capable of executing one or more operations from a group selected from read, write and execute operations on the set of data; and
a verification module, wherein the verification module is configured to verify success in the destruction of the set of data, by:
specifying an address of at least one most significant bit in the set of data;
recording a first value and a second value of the at least one most significant bit that is accessed thereby; and
comparing the first value of the at least one most significant bit with the second value so recorded.

9. The system as claimed in claim 8, further comprising designating at least one most significant bit of at least one data block in a set of data as a sentinel, wherein the at least one most significant bit is randomly selected.

10. The system as claimed in claim 8, wherein the verification module is configured to signal a positive response when the second value of the most significant bit of the sentinels associated with the data block in the stored set of data differs in comparison with the first value recorded, and a negative response when the value does not so differ.

11. The system as claimed in claim 8, wherein the verification module is configured to verify the success of the shredding of a subset of the entire stored set of data, wherein the total bit size of the subset is smaller than the total bit size of the entire stored set of data.

12. The system as claimed in claim 8, further comprising ascertaining a latency time from a service level agreement between a provider of the remote computing platform and the user whose data is stored in the remote computing platform, wherein the latency time is a time period following which one or more copies of the set of data across the one or more computational resource nodes are synchronized.

13. The system as claimed in claim 12, wherein the verification module is configured to verify the success of the shredding of the set of data following completion of the latency time associated with the remote computing platform.

14. The system as claimed in claim 13, further comprising destroying the stored set of data across each of the computational resource nodes in the remote computing platform.

15. The system as claimed in claim 8, further comprising an elevation module, wherein the elevation module is configured to grant read, write and execute access to the set of data that is stored by the user in the remote computation platform.

16. The system as claimed in claim 15, wherein the elevation module is configured to grant bit level access to the stored set of data.

17. A computer program product comprising a non-transitory computer usable medium having a computer readable program code embodied therein for shredding a set of data stored in a remote computing platform, comprising the program steps of:
designating at least one most significant bit of at least one data block in the stored set of data as a sentinel, wherein:
the at least one most significant bit is randomly selected; and
the remote cloud computing platform is accessible by means of a communication network and possesses one or more computational resource nodes, the computational resource nodes in operable communication with each other;
recording a first value of the at least one randomly selected sentinel; shredding the set of data, wherein the set of data is shredded by means of an update operation, the update operation capable of executing one or more operations from a group selected from read, write and execute operations on the set of data; and
verifying success of the shredding of the set of data, wherein a second value of the at least one sentinel is recorded and compared with the first value of the at least one sentinel.

* * * * *